US009927514B2

(12) United States Patent
Giunta et al.

(10) Patent No.: US 9,927,514 B2
(45) Date of Patent: Mar. 27, 2018

(54) METHOD AND SYSTEM FOR THE REMOTE MONITORING OF THE TWO/THREE-DIMENSIONAL FIELD OF DISPLACEMENTS AND VIBRATIONS OF OBJECTS/STRUCTURES

(71) Applicant: ENI S.p.A., Rome (IT)

(72) Inventors: Giuseppe Giunta, San Donato Milanese (IT); Andrea Monti-Guarnieri, Como (IT)

(73) Assignee: ENI S.p.A., Rome (IT)

( * ) Notice: Subject to any disclaimer, the term of this patent is extended or adjusted under 35 U.S.C. 154(b) by 358 days.

(21) Appl. No.: 14/694,139

(22) Filed: Apr. 23, 2015

(65) Prior Publication Data

US 2015/0309161 A1    Oct. 29, 2015

(30) Foreign Application Priority Data

Apr. 24, 2014   (IT) .............................. MI2014A0772

(51) Int. Cl.
*G01S 13/08* (2006.01)
*G01S 7/40* (2006.01)
(Continued)

(52) U.S. Cl.
CPC ............ *G01S 7/4021* (2013.01); *G01S 7/023* (2013.01); *G01S 7/354* (2013.01); *G01S 7/4052* (2013.01);
(Continued)

(58) Field of Classification Search
CPC ............................... G01S 7/023; G01S 7/4021
(Continued)

(56) References Cited

U.S. PATENT DOCUMENTS 4,283,725 A * 8/1981 Chisholm ................. G01S 7/40
                                                                342/174
4,300,121 A * 11/1981 Fritzsche ................ G08S 21/10
                                                                340/601
(Continued)

FOREIGN PATENT DOCUMENTS

EP          1 975 644 A2      10/2008
EP          1 975 644 A3      10/2008
(Continued)

OTHER PUBLICATIONS

Eurasian Search Report dated Nov. 11, 2015 in Patent Application No. 201590606 (with English language translation).

(Continued)

*Primary Examiner* — Marcus E Windrich
(74) *Attorney, Agent, or Firm* — Oblon, McClelland, Maier & Neustadt, L.L.P.

(57) ABSTRACT

A method and system for remote monitoring of a two/three-dimensional field of displacements and vibrations of an object, the method including transmitting of a plurality of radar waves by a plurality of corresponding radar devices positioned at a predefined distance from a plurality of corresponding receiver devices applied on the object, obtaining a first distance value between each radar device and the corresponding receiver or target device, the first distance value being affected by an error consisting of the sum between an electromagnetic propagation disturbance in the atmosphere of the radar waves and a reciprocal interference between the single receiver or target devices and one or more fixed reflectors positioned in the proximity of the receiver devices, and obtaining, simultaneously with respect to the first distance value, a second distance value between each radar device and a plurality of corresponding calibra-
(Continued)

tion devices positioned at predefined distances from said radar devices.

8 Claims, 6 Drawing Sheets

(51) Int. Cl.
    *G01S 7/02*       (2006.01)
    *G01S 7/35*       (2006.01)
    *G01S 13/58*     (2006.01)
    *G01S 13/87*     (2006.01)
    *H01Q 15/14*    (2006.01)

(52) U.S. Cl.
    CPC ............. *G01S 13/58* (2013.01); *G01S 13/87* (2013.01); *H01Q 15/14* (2013.01); *G01S 2007/4095* (2013.01)

(58) Field of Classification Search
    USPC ........................................... 342/59, 159–164
    See application file for complete search history.

(56) References Cited

U.S. PATENT DOCUMENTS

| | | | | |
|---|---|---|---|---|
| 5,134,413 A * | 7/1992 | Bruder | .................. | H01Q 15/18 342/174 |
| 5,138,322 A | 8/1992 | Nuttall | | |
| 5,657,003 A * | 8/1997 | Fuentes | .................. | G01S 11/16 340/686.1 |
| 5,828,331 A | 10/1998 | Harper | | |
| 7,895,015 B2 * | 2/2011 | Parker | ..................... | G01S 11/03 250/203.2 |
| 8,604,964 B2 * | 12/2013 | Eidloth | ................... | G01S 11/02 342/114 |
| 8,638,253 B1 * | 1/2014 | Dryer | ...................... | G01S 7/003 342/107 |
| 2007/0085730 A1 * | 4/2007 | Tsunoda | ............. | G01R 29/0821 342/165 |
| 2008/0238776 A1 | 10/2008 | Parsons et al. | | |
| 2009/0121921 A1 | 5/2009 | Stickley et al. | | |
| 2010/0289693 A1 | 11/2010 | Stickley et al. | | |
| 2011/0122024 A1 * | 5/2011 | Eidloth | ................... | G01S 3/146 342/365 |
| 2013/0044020 A1 * | 2/2013 | Dvorkin | ................ | G01H 1/003 342/28 |
| 2013/0113644 A1 * | 5/2013 | Nakagawa | .......... | G01F 23/2845 342/6 |
| 2015/0159632 A1 * | 6/2015 | Vangen | .................. | F03D 17/00 416/61 |

FOREIGN PATENT DOCUMENTS

| | | |
|---|---|---|
| GB | 2 310 099 | 8/1997 |
| RU | 2 352 909 C1 | 4/2009 |
| RU | 2 426 974 C2 | 8/2011 |
| RU | 2 446 411 C2 | 3/2012 |
| WO | WO 2007/009175 A1 | 1/2007 |

OTHER PUBLICATIONS

Italian Search Report dated Jan. 13, 2015 in Italian Application MI20140772, filed on Apr. 24, 2014 ( with English Translation of Categories of Cited Documents).

* cited by examiner

METHOD AND SYSTEM FOR THE REMOTE MONITORING OF THE TWO/THREE-DIMENSIONAL FIELD OF DISPLACEMENTS AND VIBRATIONS OF OBJECTS/STRUCTURES

The present invention relates to a method and system for the remote monitoring of the two/three-dimensional field of displacements and vibrations of objects/structures, in particular a method and system which use multiple radar sensors and passive calibration targets.

The method and system according to the invention are applied to the continuous remote monitoring of the assessment of deformations and vibrations of the objects/structures of interest by means of simultaneous measurements of two or more radar sensors positioned in remote points and, in particular, without requiring the installation of sensors in contact with the object/structure to be measured, but using only passive (or expediency) reflectors and suitable calibration targets. The measurement of displacements is effected with micrometric accuracy within an application range without saturation of the vibration measurement, ranging from about 0.01 mm to about 20 mm (depending on the wavelength). Furthermore, the measurements effected with a revisiting frequency of the scenario which depends on the detection distance, and can be tens of thousands of observations per second (about 10 kHz). Possible application fields of said method and system relate, for example, to petrochemical plants, gas compression stations, thermoelectric plants, dams and forced ducts, refineries, offshore platforms, wind turbines, bridges and viaducts, monuments, historical buildings, etc.

In the state of the art, the measurement of vibrations is mainly effected with accelerometer techniques, which however require sensors in contact with the object/structure and the laying of electric cables up to about 100 metres long. These techniques are not able to provide measurements of very slow displacements, and the sensors are subject to saturation when the displacements become significant and/or rapid. For this reason, remote measurement techniques are preferred, based on localization within 1D-3D space. These measurements are then repeated in subsequent times.

2D/3D localization on land has already been proposed with various types of sensors (radar, sonar, laser, global navigation satellite systems or GNSS, cameras) and is based on the trilateration of the data acquired by three or more sensors for identifying the localization and displacement in space. Optical-photogrammetric techniques, in particular that called "total station", require optical visibility (light, absence of mist and/or fumes, etc.) and provide millimetric accuracies, in the order of 1.5 mm, with targets equipped with prisms. The accuracy of GNSS satellite systems, on the other hand, is in the order of centimetres. These systems, moreover, require active devices (receivers), and are therefore comparable to accelerometer systems, in addition to the visibility of the constellation satellites.

Laser systems of the type defined as "Lidar", such as, for example, radar systems, do not require light sources, or external devices and provide optimum spatial resolutions in reasonable times, but the accuracy for estimating the movements is in the order of one or more millimetres (depending on the distance and laser reflectivity of the object), as also for optical systems. Radar systems provide accuracies that cannot otherwise be obtained thanks to the use of interferometric techniques.

Numerous interferometric radar systems are known in literature, affected, however, by two main problems:

the necessity of eliminating disturbances (radar noise) due to interfering targets; and the necessity of compensating the error due to atmospheric propagation and vibrations of the radar instrument.

With respect to the problem of disturbances due to so-called interfering contributions (or clutters), the solutions currently proposed are the following:

synthetic-aperture radar systems as described, for example, in the document US 2011/0298655 A1. These systems, called "SAR" (acronym of "synthetic-aperture radar"), are capable of separating contributions in space by synthesis of a radar antenna having significant dimensions. This synthesis is obtained by moving the radar sensor on a slide or with other devices, among which, for example, aeroplanes and satellites in the case of considerable distances. They are therefore cumbersome and costly devices which also require considerable time (from seconds to minutes) for every measurement acquisition, thus reducing the revisiting duration of the target;

"active" systems (such as transponders) of the type described, for example, in the document EP 2382487 A1. These systems solve the problem of interference, using different codes and/or frequencies for each device, similar to what is used in the telecommunications industry for mobile systems. The functioning principle can be attributed to that of secondary radars for aeronautical use. The limits in the use of these systems are due to the fact that they are active and must therefore be installed in direct contact with the object/structure to be measured. These systems also emit electromagnetic fields and have a limited stability over long periods of time due to thermal drifts and aging;

simultaneous optical/radar measurement systems of the type described, for example, in the document US 2006/0260407 A1, provided with one or two receiver devices for eliminating errors in the vibration field. These systems, however, do not solve the problem of interference;

inverse "SAR" radar (or "ISAR") systems of the type described, for example, in the document EP 1178330 A1, which mediate on relatively lengthy times, displacements comparable to a wavelength. Inverse SAR systems exploit a significant displacement of the target in an "across range" direction for distinguishing it from possible interferences. This leads to effective applications in a military or automobile context, but is of no interest for assessing vibrations, in which the target composed of the item/structure to be measured, substantially maintains the same position;

space-time "STAP" signal processing systems (Melvin, W. L., "A STAP overview", *Aerospace and Electronic Systems Magazine, IEEE*, vol. 19, no. 1, pages 19-35, January 2004; Ender, J., "Space-time processing for multichannel synthetic aperture radar", *Electronics & Communication Engineering Journal*, February 1999). Also in this case, it is assumed that the movement of the target extends for numerous wavelengths, i.e. for many centimetres.

With respect, on the other hand, to the problem of electromagnetic propagation error, due to a fluctuation in the refraction index of the atmosphere, some of the solutions currently proposed are the following:

the process for radar measurements of displacements in urban areas and landslide areas described in the document WO 00/72045 A1;

the technical article "*Ground-based radar interferometry for landslides monitoring: atmospheric and instrumental decorrelation sources on experimental data*", published in November 2004 in "*Geoscience and Remote Sensing, IEEE Transactions on*, vol. 42, n. 11, pages 2454-2466".

These technical solutions are based on synthetic-aperture radar (SAR) systems, in which the identification of stable scatterers, subsequently used for compensating electromagnetic propagation disturbance, is effected by exploiting the movement of the platform. A summary of these technical solutions is also provided by "Iannini, L.; Guarnieri, A. M.: *Atmospheric phase screen in ground-based radar: statistics and compensation*", published in May 2011 in "*Geoscience and Remote Sensing Letters, IEEE*, vol. 8, n. 3, pages 537-541". The common characteristic of these technical measurement solutions is the use of "SAR" radar systems for removing the clutter and for subsequently identifying stable reference targets in the scenario, or for exploiting observations on extremely lengthy time ranges (from months to years), incompatible with the conditions at the basis of the method and system according to the present invention.

Interferometric radar measurement techniques generally provide unequalled performances in terms of spatial accuracy (micrometres) in the case of remote measurements and are also free of saturation, directly measuring the positions, and finally, not requiring the presence of active targets.

The main critical aspects of these measurement techniques, however, lie in the sensitivity to movement of the radar sensor, in tropospheric disturbance and disturbance of clutters due to interfering targets. The use of synthetic-aperture radar (SAR) devices, or also of real-aperture radar devices, can provide an effective solution to these problems, but complex devices must be used, which are extremely cumbersome and with lengthy intervals between measurements. In other cases, the disturbance of clutters is eliminated by the application of space-time filters, but only assuming that the movement extends for numerous wavelengths (in the order of centimetres).

The objective of the present invention is therefore to provide a method and system for the remote monitoring of the two/three-dimensional field of displacements and vibrations of objects/structures, in particular a method and system which uses multiple radar sensors and passive calibration targets, which are capable of solving the drawbacks of the known art indicated above in an extremely simple, economical and particularly functional manner.

The method and system for the remote monitoring of the two/three-dimensional field of displacements and vibrations of objects/structures according to the present invention exploit the use of a plurality of radar sensors synchronized with each other and an antenna with a high angular aperture (tens of degrees), so as to simultaneously include all the targets of interest in the scenario. This allows reference corners to be used. The method and system according to the invention allow an estimation of the vibrational field to be effected, simultaneously compensating atmospheric propagation and vibration effects of the radar sensors themselves.

The method and system according to the invention do not provide the absolute localization of the target, but only its spatial variation with time, allowing the reconstruction of the two/three-dimensional (2D/3D) vibration field, known except for a constant. In order to allow these measurements to be effected, the problem of clutter disturbance, which becomes fundamental in radar sensors with a wide visual angle, is solved by means of an innovative processing in the case of fixed clutters and with an appropriate calibration technique in the case of slow-motion clutters.

These objectives according to the present invention are achieved by providing a method and system for the remote monitoring of the two/three-dimensional field of displacements and vibrations of objects/structures as specified in the independent claims.

Further characteristics of the invention are highlighted in the dependent claims, which are an integral part of the present description.

The characteristics and advantages of a method and system for the remote monitoring of the two/three-dimensional field of displacements and vibrations of objects/structures according to the present invention will appear more evident from the following illustrative and non-limiting description, referring to the enclosed schematic drawings in which:

FIGS. 1A and 1B respectively show, in a detailed view and more schematic view, an embodiment of the monitoring system according to the present invention, of which three radar devices, a clock unit which provides the synchrony (FIG. 1A), three calibration devices and the targets to be monitored, are illustrated;

FIGS. 2A and 2B respectively show preferred embodiments of a calibration device and a target to be monitored;

FIG. 3 is a diagram which shows the functioning principle of the system and method according to the invention, based on the removal of interference from a fixed target. In the complex plane, the radar measurement affected by interference is identified with the vector P, whereas the vector N is the interference contribution of the fixed target. The phase measured under interference conditions is indicated with $\varphi_e$, whereas the desired phase, without interference, is indicated with $\varphi$, which varies with time as a result of the movement of the target (positions indicated from points along the radius circumference $\rho$). The removal of the interference is based by estimating the interference contribution N as centre of the radius circumference $\rho$ on which the points indicative of the various positions of the target are situated;

Figure 8A:
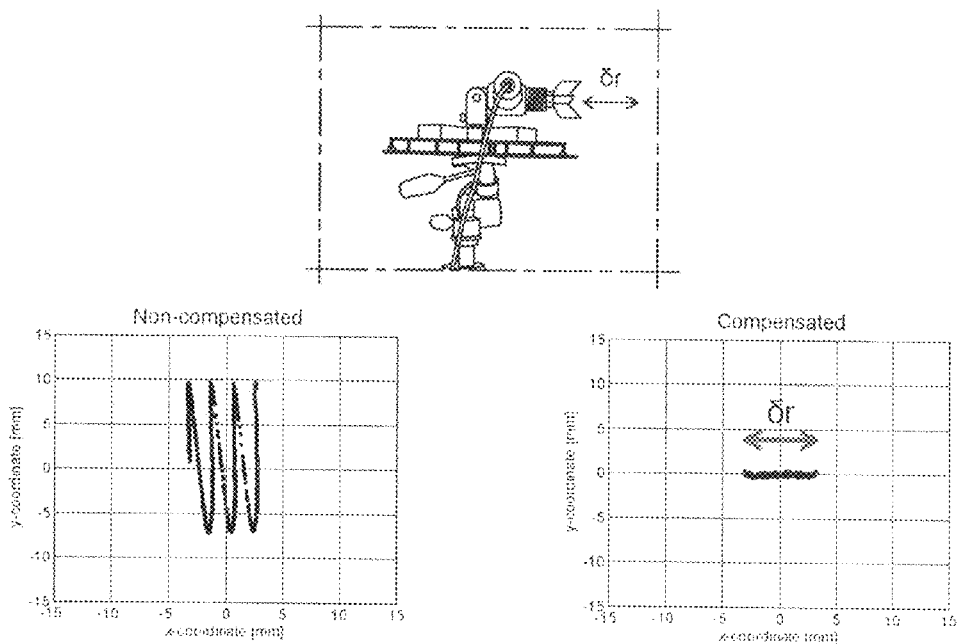
Figure 8B:
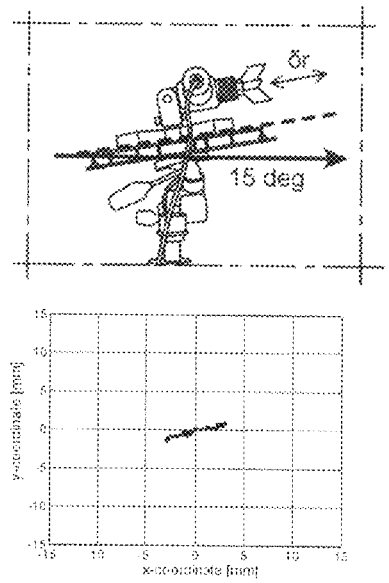
Figure 9:
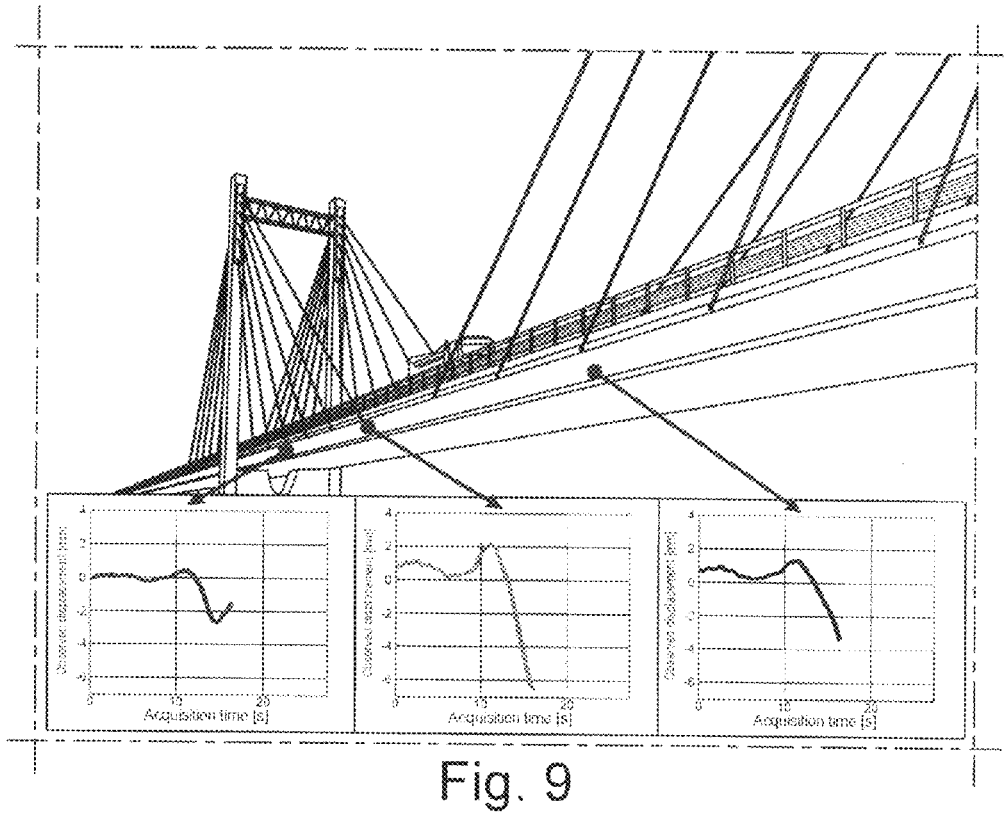

FIGS. 8A and 8B respectively show the amplitude and direction in space of the vibration measured by the radar device following application of the correction technique of the stable "iso-range" target, increasing the accuracy of the displacement observed; and FIG. 9 shows a practical example of use of the interference removal technique, applied to a real continuous remote monitoring case consisting of the measurement of the deformations on a suspension bridge due to the passage of an articulated vehicle. The deformations were corrected by removing the "iso-range" interference targets, also stable in this case, increasing the accuracy of the displacement observed.

With reference to the figures, these show a method and system for the remote monitoring of the two/three-dimensional field of displacements and vibrations of objects/structures. In particular, the method and system according to the invention envisage measurement of the displacement and vibration with the use of at least two devices or radar sources ($R_1$, $R_2$ and $R_3$) suitably synchronized with each other. More specifically, the use of two devices or radar sources $R_1$ and $R_2$ is envisaged in the case of the reconstruction of two-dimensional fields and three devices or radar sources $R_1$, $R_2$ and $R_3$ for reconstructing three-dimensional fields.

The two or more radar devices $R_1$, $R_2$ and $R_3$ operate in a monostatic and time division configuration, which means that each radar device $R_1$, $R_2$ and $R_3$ transmits and receives its own radar signal, and are synchronized with each other by means of an external reference system 10, such as, for example, a master-clock generator, to avoid reciprocal interference. Each radar device $R_1$, $R_2$ and $R_3$ is configured for measuring two or more corresponding physical points of the item/structure 12 positioned at different distances from the respective radar devices $R_1$, $R_2$ and $R_3$ (observation range). These physical points are equipped with two or more respective receiver or target devices $T_1$, $T_2$ and $T_3$ visible from a wide angle by the radar devices $R_1$, $R_2$ and $R_3$. The targets $T_1$, $T_2$ and $T_3$ can consist, for example, of trihedral reflector elements (FIG. 2B), Luneburg spherical lenses or other similar devices.

The accurate measurement of positions and one-dimensional displacements of an object with the use of a single radar device and the interferometric technique generally exploits a knowledge of the back-propagated phase of the radar waves (having removed the ambiguity of multiples of $2\pi$) for determining the "LOS" (acronym of "line of sight") distance $R_{LOS}(R,T)$ between the radar device and object or, more specifically, the target positioned on the object itself:

$$R_{LOS}(R, T) = \frac{\psi(t)}{4\pi} \frac{c}{f_0} \qquad (1)$$

The use of this measurement technique is known art for land and satellite systems, wireless systems, acoustic (sonar) systems, etc. This measurement technique is intrinsically one-dimensional and is therefore not capable of localizing the object in a three-dimensional (3D) space. For the same reason, it is insensitive to small displacements orthogonal to the observation/sight direction. The 3D localization of physical points of the object, also known art, is based on the bi/trilateration of the data acquired from two or more sensors for identifying the localization and displacements of the target under observation.

The distance $R_{LOS}(R_k, T_n)$ between an $n^{th}$ target $T_n$ and a corresponding $k^{th}$ device or radar source $R_k$, is represented hereunder, specifically taking into account the vibratory movement $\Delta R_{LOS}(t, R_k, T_n)$ of said device or radar source $R_k$ with time, and also the electromagnetic propagation disturbance in the atmosphere $d_{aps}$ (assumed as additive) of the radar waves:

$$R_{LOS}(R_k, T_n) + \Delta R_{LOS}(t, R_k, T_n) = \frac{\psi_{n,k}(t)}{4\pi} \frac{c_0}{f_0} + d_{aps}(t, R_k, T_n) + w_{n,k}(t) \qquad (2)$$

wherein $\psi_{n,k}$ represents the measurement of the phase of the signal received from the $n^{th}$ target and from the $k^{th}$ device or radar source $R_k$, unwound as in techniques described in literature, whereas $w_{n,k}(t)$ is the error due to the contribution of the disturbance of the system and the reciprocal interference between the various targets $T_n$ and fixed reflectors positioned in the proximity of said targets $T_n$. In traditional measurement systems according to the known art, the term on the left of equation (2) is obtained starting from the phase measurements (term on the right), and also on the basis of secondary information, known in advance, that allow to solve the ambiguity of the phase (known only except for multiples of $2\pi$) and the electromagnetic propagation disturbance in the atmosphere $d_{aps}$.

Figure 1A:
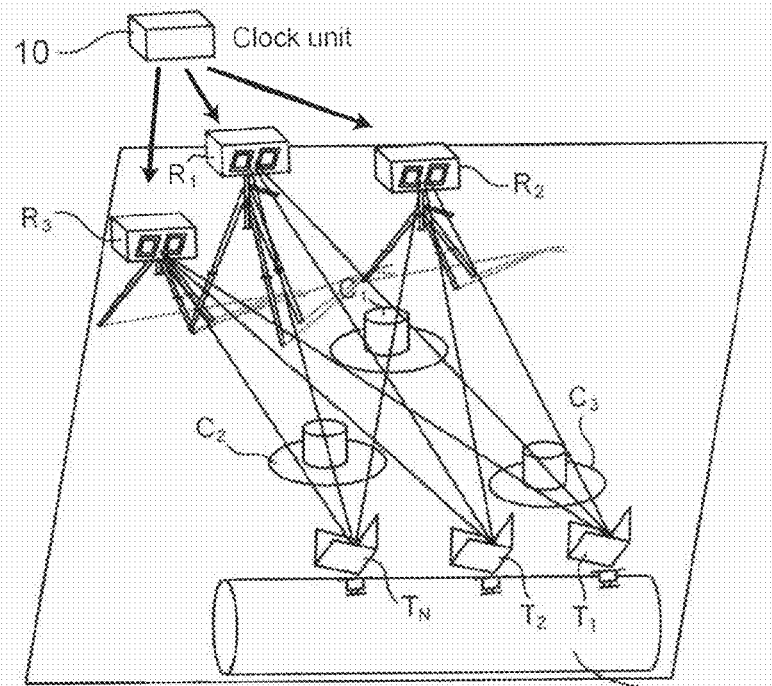
Figure 1B:
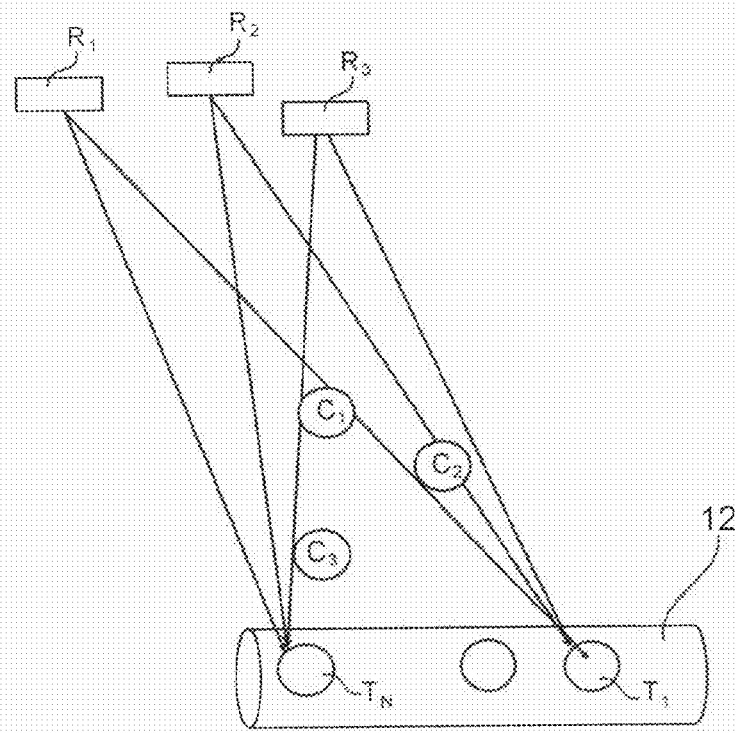
Figure 2A:
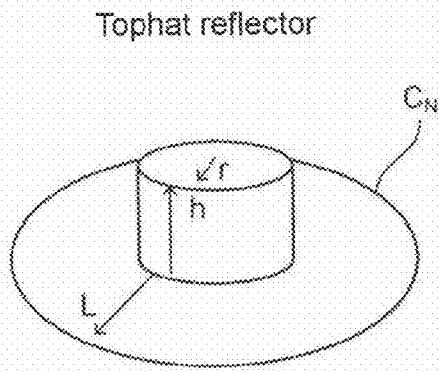
Figure 2B:
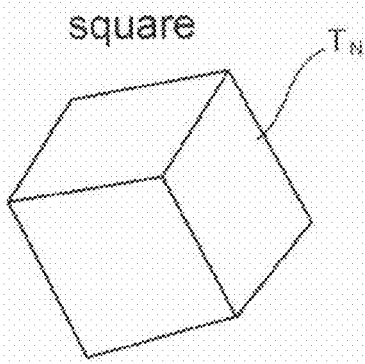

In the monitoring method and system according to the present invention, the problem of the measurement is faced with a different solution. The measurement of the distance between the radar devices $R_1$, $R_2$ and $R_3$ and the corresponding fixed calibration devices $C_1$, $C_2$ and $C_3$ positioned at predefined distances from said radar devices $R_1$, $R_2$ and $R_3$ as indicated, for example, in FIGS. 1A and 1B, is effected simultaneously. The calibration devices $C_1$, $C_2$ and $C_3$ can consist, for example, of trihedral reflector elements, Luneburg spherical lenses, "top-hat"-type or other reflector elements (FIG. 2A). Equation (2) is therefore modified as follows:

$$R_{LOS}(R_k, C_p) + \Delta R_{LOS}(t, R_k, C_p) = \frac{\psi_{n,k}(t)}{4\pi} \frac{c_0}{f_0} + d_{aps}(t, R_k, C_p) \qquad (3)$$

wherein $C_p$ indicates the position of the fixed calibration devices $C_1$, $C_2$ and $C_3$, measured with precision. The distance and spatial positioning is such that the disturbances are negligible, i.e. the term $w_{n,k}(t)$ of equation (2).

The electromagnetic propagation disturbance in the atmosphere $d_{aps}$ is approximated as a constant term and a linear term with the distance, characterizing it, for each time, by a pair of parameters $k_0$ and $k_1$:

$$d_{aps}(t, R_k, C_p) \approx k_0(t) + k_1(t) R_{LOS}(R_k, C_p) \qquad (4)$$

which allows the distance between the radar devices $R_1$, $R_2$ and $R_3$ and the corresponding fixed calibration devices $C_1$, $C_2$ and $C_3$ to be defined with the following equation (5):

$$R_{LOS}(R_k, C_p) = \frac{\psi_{n,k}(t)}{4\pi} \frac{c_0}{f_0} + [k_0(t) - \Delta R_{LOS}(t, R_k, C_p)] + [k_1(t)] R_{LOS}(R_k, C_p)$$

Two interferometric measurements are effected for each device or radar source $R_k$ and for each time t with respect to two calibration devices $C_p$, writing two separate equations (5). The measurements $\psi_{n,k}$ and the distances $R_{LOS}$ are known and the two terms $k_0$ and $k_1$ between the square brackets are unknown. The estimated value of these terms $k_0$ and $k_1$ is subtracted from equation (2).

In this way is obtained simultaneously the compensation of the disturbance due to the electromagnetic propagation in the atmosphere $d_{aps}$ and the vibratory movement $\Delta R_{LOS}(t, R_k, T_n)$ specific to each device or radar source $R_k$, returning to the ideal equation (1). The only difference consists in the term $w_{n,k}$, which represents the contribution of noise (micrometric in radar measurements) and disturbance from interference with "iso-range" target, i.e. one or more targets substantially stationary and substantially positioned at a distance from each device or radar source $R_k$ substantially equal to the distance of the object/structure 12 from said device or radar source $R_k$.

Figure 3:
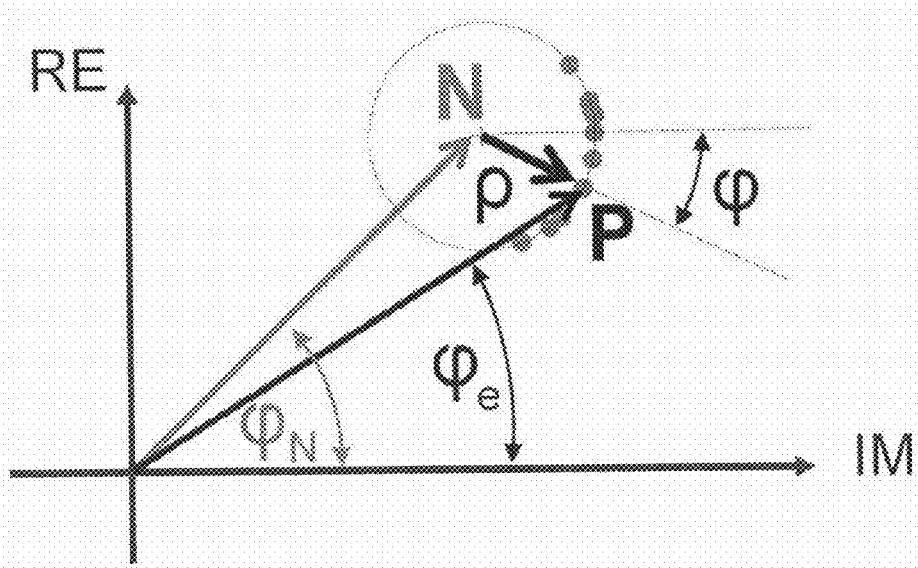

The method according to the invention proposes processing data for the removal of radar interference from "iso-range" targets when they are fixed (stationary). The principle is described in FIG. 3. The radiofrequency signal received from each device or radar source $R_k$, demodulated and converted into a complex signal P(t), can be represented as:

$$P(t) = N + \rho \exp(j\varphi(t)) \quad (6)$$

i.e. the sum of the interfering contribution N, complex but with a constant phase (as it is stationary), and the useful signal $\rho\exp(j\varphi(t))$, obtained from the target $T_n$ in movement, with a variable phase with time (quantity to be measured). If equation (1) is applied to the phase P(t), an error is obtained as indicated in FIG. 3. The phase P(t), in fact, differs from the useful signal phase $\varphi(t)$ in the term $\varphi_e$, which is null only in the absence of the additive disturbance N due to the fixed target. This problem is known in literature and there are techniques for cancelling the interfering contribution N, assuming that the motion extends for numerous wavelengths (in the order of centimetres). These techniques are effective not only with respect to the disturbance from a fixed target, but also with respect to the disturbance from a movable target $T_n$, provided the movement is slow with respect to the object/structure 12 of interest, but they cannot be applied in the case of vibrations with a reduced amplitude, comparable to or less than the wavelength.

The method according to the invention effects the estimation of the useful signal phase $\varphi(t)$ as follows:
1. the interfering contribution N is reconstructed as the centre of the circumference represented in FIG. 3, determining three parameters $\rho_N$, $\varphi_N$, $\rho$ so as to minimize the following error function:

$$\Sigma_n ||P(n) - \rho_N \exp(j\varphi_N)| - \rho| \quad (7)$$

wherein P(n) is the complex radar datum measured in consecutive times. The samples P(n) are selected so as to favour the angular dispersion of the measurements, thus improving the estimation of the centre of the circle;
2. the reconstructed complex constant $\rho_N\exp(j\varphi_N)$, i.e. interference from the fixed target is removed from the datum P(n);
3. the useful signal phase $\varphi(t)$ of the result obtained is estimated.

After the compensation of the two errors (disturbance due to the interfering contribution N and disturbance due to the electromagnetic propagation in the atmosphere $d_{aps}$), a system of three equations (8) must be resolved, for each target $T_n$, which indicates the compensated distance of said targets $T_n$ from the two/three respective radar devices $R_k$ (with k=1, 2, 3):

$$\sqrt{(x_k - x_n(t))^2 + (y_k - y_n(t))^2 + (z_k - z_n(t))^2} =$$
$$-\frac{\varphi_{n,k}(t)}{4\pi} \frac{c_0}{f_0} - [k_0(t) - \Delta R_{LOS}(t, R_k, C_p)] - [k_1(t)]R_{LOS}(R_k, C_p)$$

wherein $x_k$, $y_k$ and $z_k$ represent the (known) position Cartesian components of each radar device $R_k$, $x_n$, $y_n$ and $z_n$ represent the Cartesian components of the position (to be determined) of each target $T_n$, the terms between the square brackets are disturbances due to electromagnetic propagation in the atmosphere $d_{aps}$ estimated from the fixed targets and the terms of phase $\varphi_{n,k}$ are removed from the interference by the fixed targets as described above.

The resolution of the system of equations (8) is effected by linearizing the variations in motion with respect to the nominal position of each radar device $R_k$ and each target $T_n$ measured with a Laser Scanning-Lidar spatial detection system or other geometrical detection technique, in the calibration phase. The three-dimensional vibration field on the physical measurement points $\{x_n(t), y_n(t), z_n(t)\}$ of the object/structure 12 are thus obtained.

Figure 4:
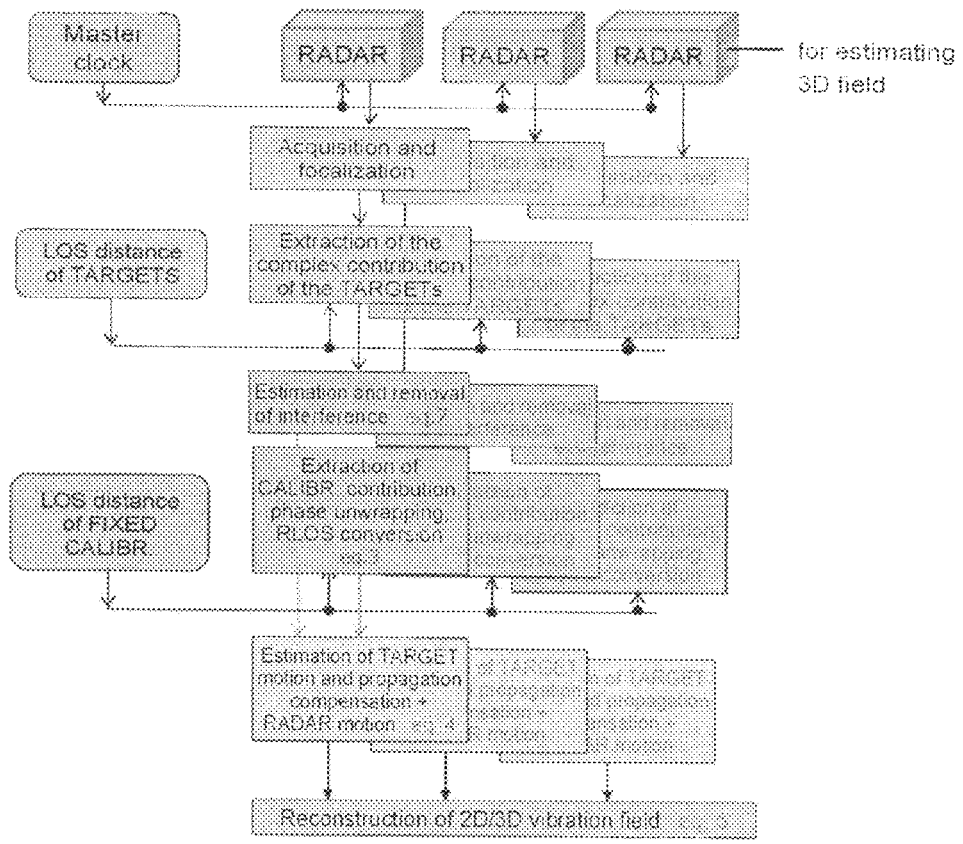
FIG. 4 is a block scheme which illustrates the phases of the monitoring method according to the invention for the generation of the 2D/3D vibration field.

With reference to FIG. 4, this schematizes, through respective functional blocks, the phases of the data processing procedure for obtaining the two/three dimensional field of displacements and vibrations of the object/structure 12.

These phases substantially consist in:
a) geometrical calibration of the system;
b) acquisition and compression of the data coming from the radar devices $R_k$;
c) estimation and removal of the interference from the fixed target with equation (7);
d) extraction of the unwound phase in correspondence with the fixed calibration devices $C_p$ with equation (3);
e) estimation of the disturbance of the electromagnetic propagation in the atmosphere $d_{aps}$ and radar $R_k$—target $T_n$ motion starting from the calibration devices $C_p$ with equation (4);
f) removal of the effects of the disturbance of the electromagnetic propagation in the atmosphere $d_{aps}$ and radar $R_k$—target $T_n$ motion;
g) estimation of the deformations of the object/structure 12 by unwinding the phase measured by each radar device $R_k$ at each calibration device $C_p$;
h) reconstruction of the two/three-dimensional vibration field of the object/structure 12, referring to the compensated distance of the targets $T_n$ from the respective radar devices $R_k$, linearizing and inverting, or pseudo-inverting, the system of equations (8).

Figure 5:
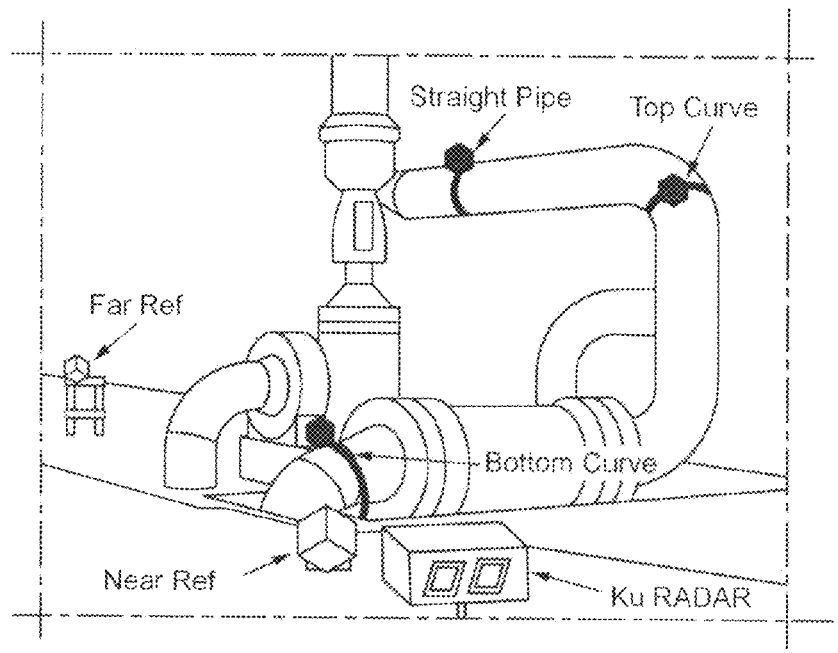
FIG. 5 shows an application example of the system according to the invention, illustrating a radar device ("ku radar"), two calibration and correction targets ("near ref" and "far ref") and three passive measurement targets ("straight pipe", "top curve" and "bottom curve"), installed on an item/structure consisting of a pipeline of a gas power station.
Figure 6:
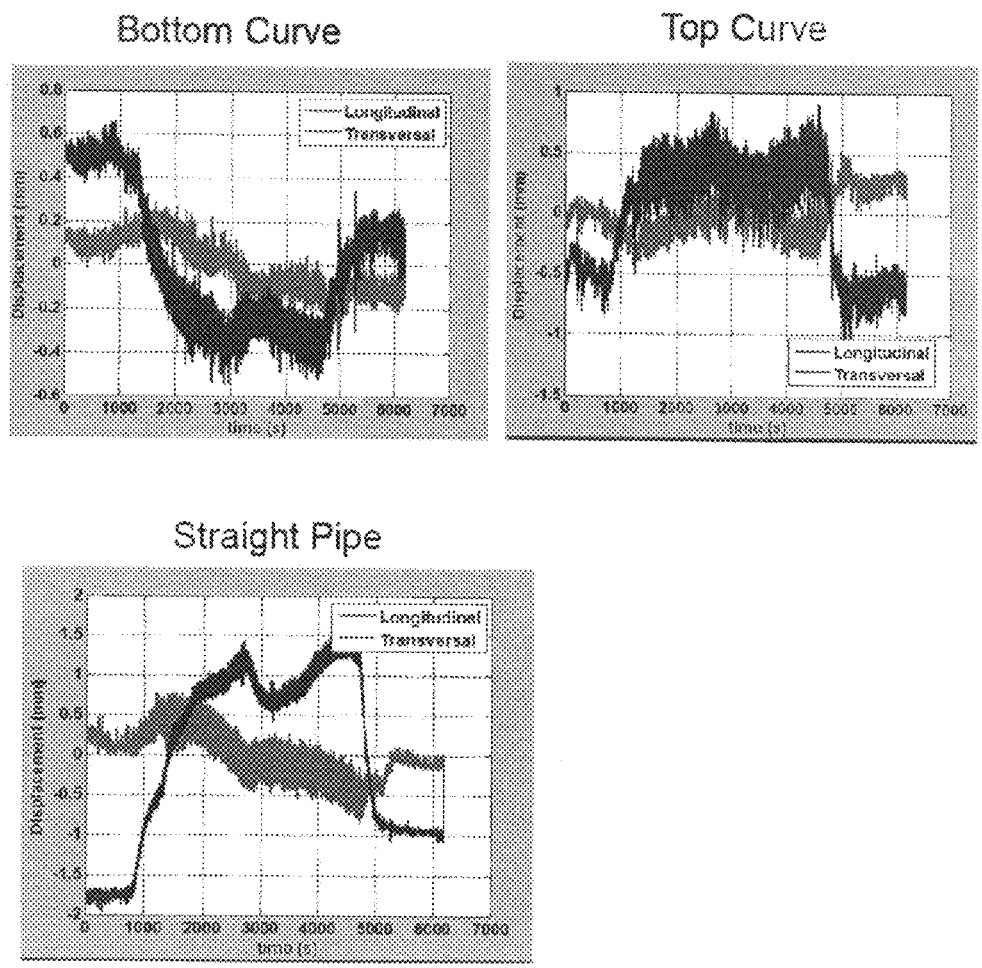
FIG. 6 is a diagram which shows the sub-millimetric deformation result of the pipeline in correspondence with three monitored points ("straight pipe", "top curve" and "bottom curve"), obtained in the experiment of FIG. 5, in which the activation range of the gas power station can be clearly seen.

FIG. 5 illustrates a monitoring example of a pipeline of an industrial plant leaving a gas compression station which has deformation and vibration movements with the activation of the plant operations. The monitoring system envisages the provision of the calibration network and passive monitoring targets for applying the accurate derivation method of the displacement in space of the pipeline. The monitoring system therefore comprises two radar devices ("ku radar"), of which only one is visible in FIG. 5, two calibration and correction targets ("near ref" and "far ref") and three passive measurement targets ("straight pipe", "top curve" and "bottom curve"), installed on the pipeline. The components of the vibrations reconstructed in the two dimensions in the direction of the pipeline and orthogonal to it, are shown in FIG. 6.

Figure 7:
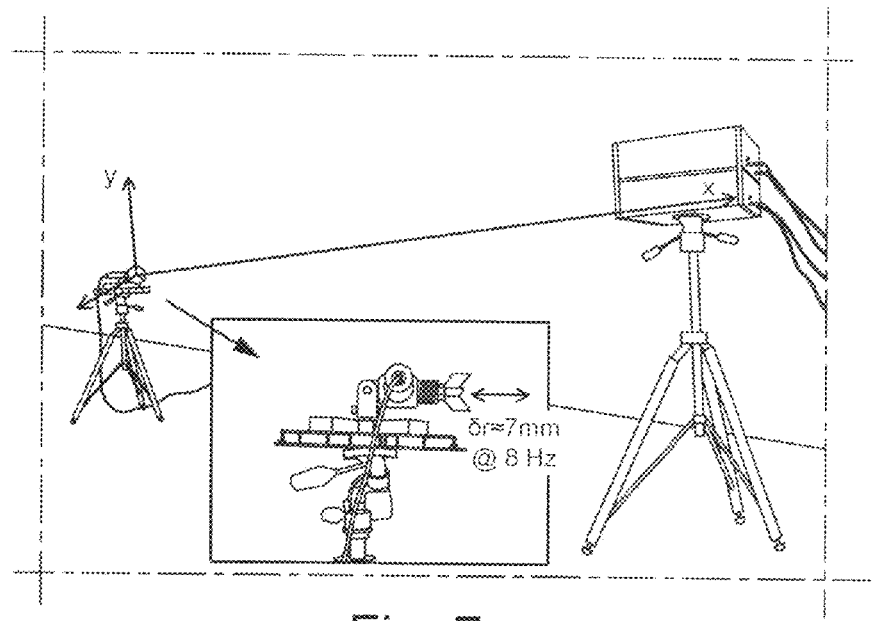
FIG. 7 shows the set-up phase of the validation experiment of the method and system according to the invention, in which the artificial target is assembled a few metres away from the sensors and is activated by a sinusoidal motion with a peak-peak amplitude of 7 mm.

FIG. 7 illustrates a measurement example of the 3D vibration of an artificial target caused to vibrate by an appropriate mechanical actuator. The experiment was carried out with two radar sensors operating simultaneously and demonstrated the effectiveness of the removal technique of "iso-range" target interference, consisting in this specific case of the supporting tripod of the target.

Finally, FIG. 9 illustrates a measurement example of the displacement and deformation of a suspension bridge with the passage of an articulated vehicle. The experiment was effected with two radar sensors operating simultaneously and demonstrated, in a real operative environment, the effectiveness of the removal technique of "iso-range" target interference. FIG. 9 represents a snapshot of the monitoring experiment and shows the results obtained at a particular moment of time during the passage of the articulated vehicle.

It can thus be seen that the method and system for the remote monitoring of the two/three-dimensional field of displacements and vibrations of objects/structures according to the present invention achieve the objectives previously specified.

The method and system for the remote monitoring of the two/three-dimensional field of displacements and vibrations of objects/structures of the present invention thus conceived, can in any case undergo numerous modifications and variants, all included in the same inventive concept. The protection scope of the invention is therefore defined by the enclosed claims.

The invention claimed is:

1. A method for the remote monitoring of a two/three-dimensional field of displacements and vibrations of an object/structure, the method comprising the following steps:

transmitting a plurality of radar waves by a plurality of corresponding radar devices ($R_k$) placed at a predefined distance from a plurality of corresponding receiver or target devices ($T_n$) applied on the object/structure;

obtaining a first distance value ($R_{LOS}(R_k,T_n)$) between each radar device ($R_k$) and the corresponding receiver or target device ($T_n$), wherein said first distance value ($R_{LOS}(R_k,T_n)$) is affected by the sum of electromagnetic propagation disturbance in the atmosphere ($d_{aps}$) of the radar waves and an error ($w_{n,k}(t)$) due to reciprocal interference between the single receiver or target devices ($T_n$) and one or more fixed reflectors positioned in the proximity of said receiver or target devices ($T_n$);

obtaining, simultaneously with respect to the first distance value ($R_{LOS}(R_k,T_n)$), a second distance value ($R_{LOS}(R_k,C_p)$) between each radar device ($R_k$) and a plurality of corresponding calibration devices ($C_p$) placed at predefined distances from said radar devices ($R_k$), wherein said second distance value ($R_{LOS}(R_k,C_p)$) is affected only by electromagnetic propagation disturbance in the atmosphere ($d_{aps}$) of the radar waves;

estimating and removing the contribution of the electromagnetic propagation disturbance in the atmosphere ($d_{aps}$) of the radar waves to obtain a second corrected distance value;

estimating and removing the error ($w_{n,k}(t)$) due to the reciprocal interference between the single receiver or target devices ($T_n$) and one or more fixed reflectors positioned in the proximity of said receiver or target devices ($T_n$), to obtain a first corrected distance value, said first corrected distance value defining the entity of the spatial displacement of the object/structure.

2. The method according to claim 1, wherein the transmitting step is performed by two or more radar devices ($R_1$, $R_2$, $R_3$) operating in a monostatic and time division configuration, which means that each radar device ($R_1$, $R_2$, $R_3$) transmits and receives its own radar signal, said radar devices ($R_1$, $R_2$, $R_3$) being synchronized with each other by means of an external reference system to avoid reciprocal interference, wherein each radar device ($R_1$, $R_2$, $R_3$) is configured for measuring physical points of the object/structure positioned at different distances from the respective radar devices ($R_1$, $R_2$, $R_3$) and wherein said physical points are equipped with two or more respective receiver or target devices ($T_1$, $T_2$, $T_3$).

3. The method according to claim 2, wherein the first distance value ($R_{LOS}(R_k,T_n)$) between each radar device ($R_k$) and the corresponding receiver or target device ($T_n$) is given by the equation:

$$R_{LOS}(R_k, T_n) + \Delta R_{LOS}(t, R_k, T_n) = \frac{\psi_{n,k}(t)}{4\pi} \frac{c_0}{f_0} + d_{aps}(t, R_k, T_n) + w_{n,k}(t)$$

wherein $\Delta R_{LOS}(t,R_k,T_n)$ represents a vibratory motion as a function of time of the k-th radar device ($R_k$) and $\psi_{n,k}$ represents the measurement of the phase of the signal received from the n-th receiver or target device ($T_n$) and the k-th radar device ($R_k$).

4. The method according to claim 3, wherein the estimation and removal step of the contribution of the electromagnetic propagation disturbance in the atmosphere ($d_{aps}$) of the radar waves envisages the approximation of said electromagnetic propagation disturbance in the atmosphere ($d_{aps}$) of the radar waves as a constant term and a linear term with the distance, characterizing it, for each time value, by a pair of parameters according to the equation:

$$d_{aps}(t,R_k,C_p) \approx k_0(t) + k_1(t) R_{LOS}(R_k,C_p).$$

5. The method according to claim 4, wherein the second distance value ($R_{LOS}(R_k,C_p)$) between each radar device ($R_k$) and the corresponding calibration device ($C_p$) is given by the equation:

$$R_{LOS}(R_k, C_p) = \frac{\psi_{n,k}(t)}{4\pi} \frac{c_0}{f_0} + [k_0(t) - \Delta R_{LOS}(t, R_k, C_p)] + [k_1(t)] R_{LOS}(R_k, C_p)$$

wherein the estimated value of said pair of parameters ($k_0$, $k_1$) is subtracted from the calculation equation of the first distance value ($R_{LOS}(R_k,T_n)$), simultaneously obtaining the compensation of the electromagnetic propagation disturbance in the atmosphere ($d_{aps}$) of the radar waves and of the vibratory motion as a function of time of the k-th radar device ($R_k$).

6. The method according to claim 5, wherein the estimation and removal step of the error ($w_{n,k}(t)$) due to the reciprocal interference between the single receiver or target devices ($T_n$) and one or more fixed reflectors positioned in the proximity of said receiver or target devices ($T_n$) comprises the demodulation and conversion into a complex signal P(t) of the radar waves received from each radar device ($R_k$):

$$P(t)=N+\rho\exp(j\varphi(t))$$

wherein said complex signal P(t) is equal to the sum of an interfering contribution N and a useful signal $\rho\exp(j\varphi(t))$, obtained from each receiver or target device ($T_n$) in motion, with a phase variable as a function of time.

7. The method according to claim 6, wherein the estimation of the useful signal term $\varphi(t)$ comprises the following steps:

reconstruction of the interfering contribution N, determining three parameters ($\rho_N$, $\varphi_N$, $\rho$) so as to minimize the following error function:

$$\sum_n ||P(n) - \rho_N \exp(j\varphi_N)| - \rho|$$

wherein P(n) is the complex radar datum measured in consecutive times, selecting the samples so as to represent the maximum angular dispersion;

removal from the datum P(n) of the reconstructed complex constant $\rho_N \exp(j\varphi_N)$, i.e. interference from the fixed reflector;

estimation of the useful signal phase $\varphi(t)$ of the result obtained.

8. The method according to claim 7, wherein following the estimation and removal steps of the contribution of the electromagnetic propagation disturbance in the atmosphere ($d_{aps}$) of the radar waves and of the error ($w_{n,k}(t)$) due to the reciprocal interference between the single receiver or target devices ($T_n$) and one or more fixed reflectors positioned in the proximity of said receiver or target devices ($T_n$), a compensated distance of each receiver or target device ($T_n$) is obtained from the respective radar device ($R_k$) with the following system of equations:

$$\sqrt{(x_k - x_n(t))^2 + (y_k - y_n(t))^2 + (z_k - x_n(t))^2} = -\frac{\varphi_{n,k}(t)}{4\pi} \frac{c_0}{f_0} - [k_0(t) - \Delta R_{LOS}(t, R_k, C_p)] - [k_1(t)]R_{LOS}(R_k, C_p)$$

wherein $x_k$, $y_k$ and $z_k$ represent the known position Cartesian components of each radar device ($R_k$), whereas $x_n$, $y_n$ and $z_n$ represent the Cartesian components of the position to be determined of each receiver or target device ($T_n$), the resolution of said system of equations being effected by linearizing the variations in motion with respect to the nominal position of each radar device ($R_k$) and each receiver or target device ($T_n$) in order to obtain the two/three-dimensional vibration field on the physical measurement points {$x_n(t)$, $y_n(t)$, $z_n(t)$} of the item/structure.

* * * * *